L. H. ALBERS.
AUTOMATIC FLUID BRAKE.
APPLICATION FILED AUG. 6, 1912.
1,053,263.
Patented Feb. 18, 1913.
2 SHEETS—SHEET 1.
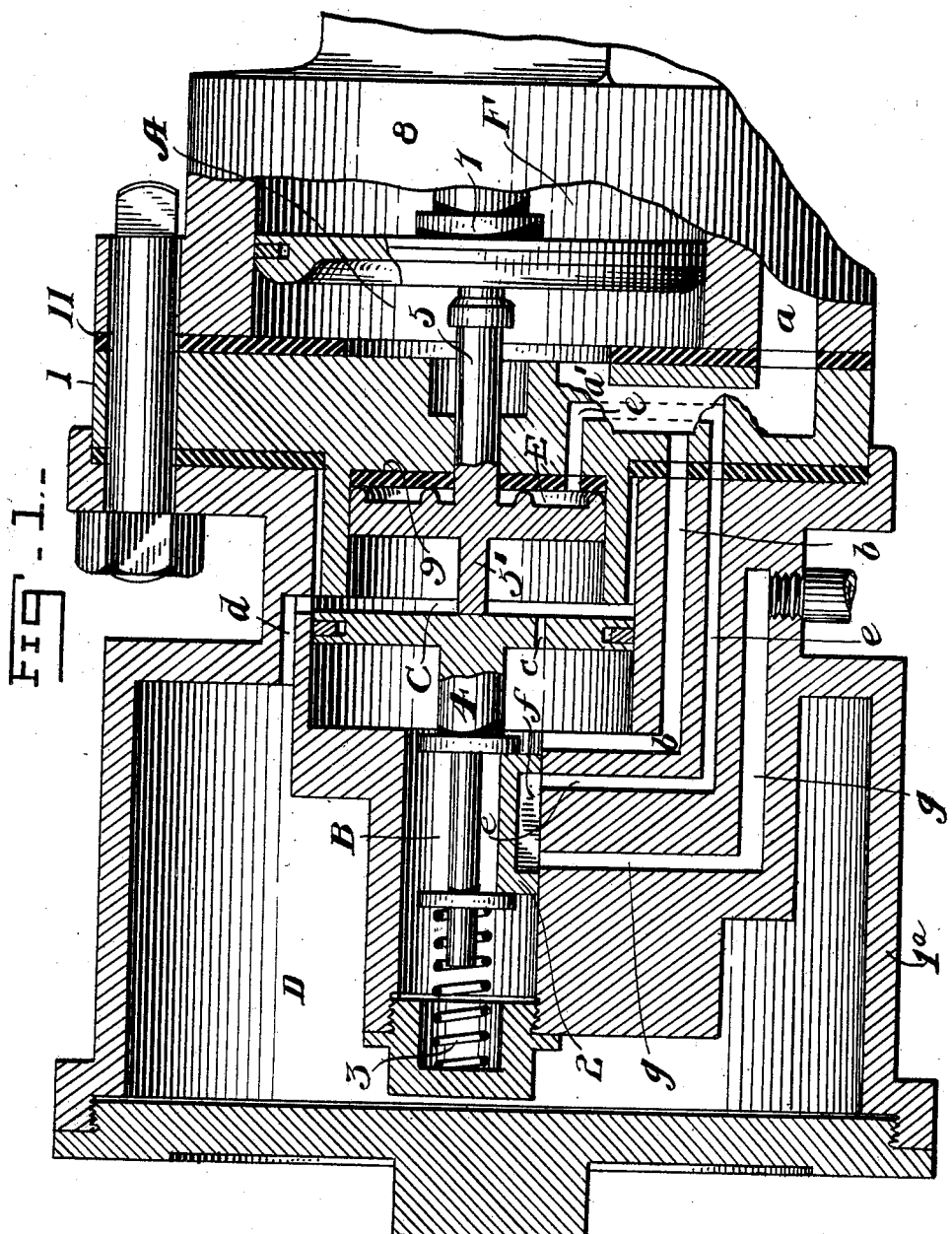
WITNESSES
INVENTOR
Louis H. Albers
By H. W. Stevenson
ATTORNEY L. H. ALBERS.
AUTOMATIC FLUID BRAKE.
APPLICATION FILED AUG. 6, 1912.
1,053,263.
Patented Feb. 18, 1913.
2 SHEETS—SHEET 2.
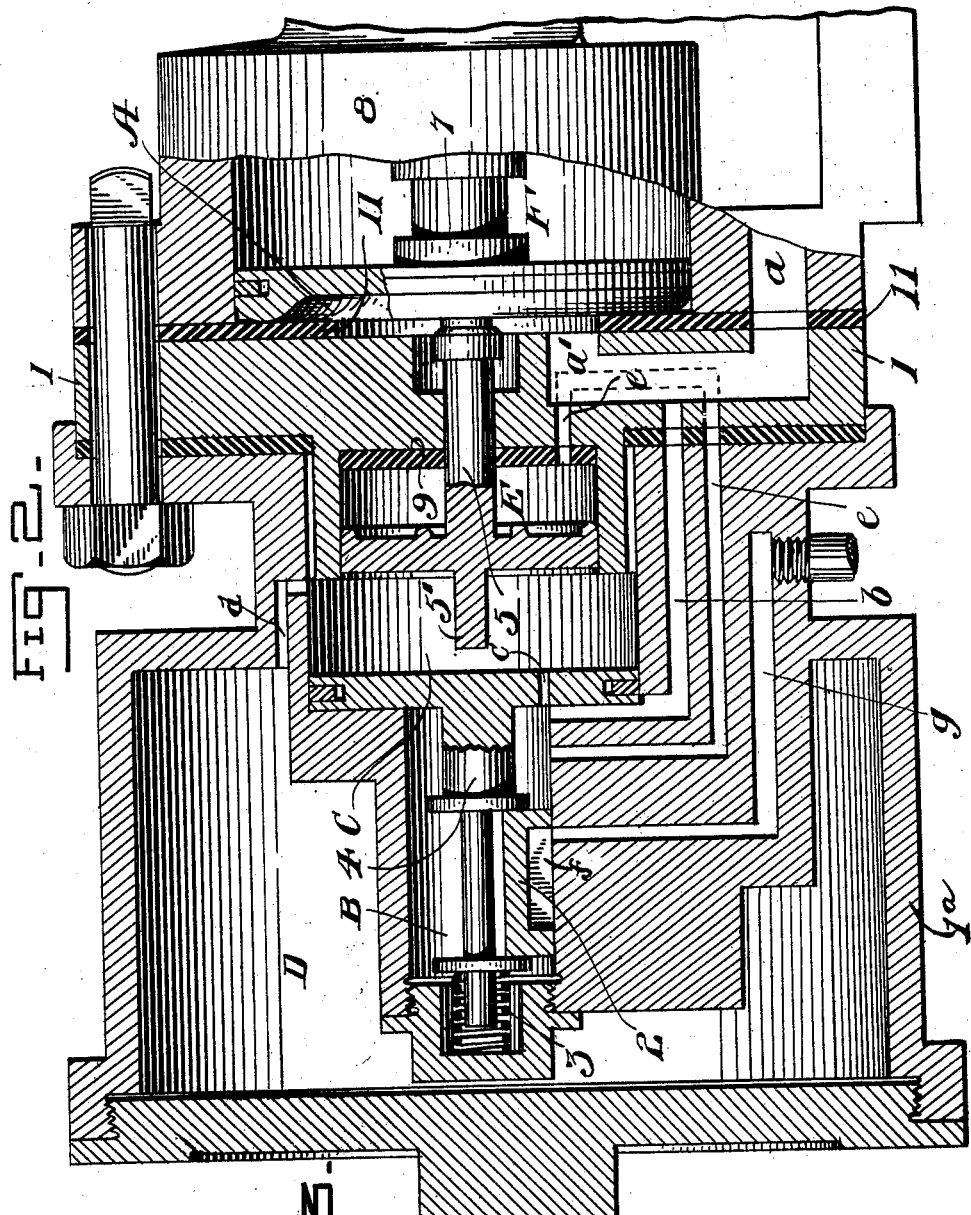
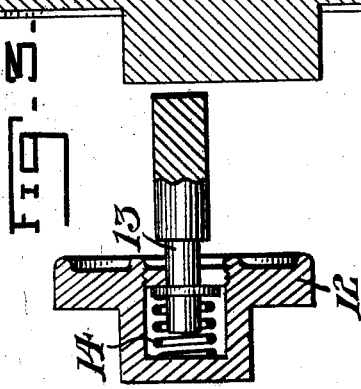
WITNESSES
INVENTOR
Louis H. Albers
By H. W. Stevenson
ATTORNEY

UNITED STATES PATENT OFFICE.

LOUIS H. ALBERS, OF ALBANY, NEW YORK.

AUTOMATIC FLUID-BRAKE.

1,053,263.  Specification of Letters Patent.  Patented Feb. 18, 1913.

Application filed August 6, 1912. Serial No. 713,562.

*To all whom it may concern:*

Be it known that I, LOUIS H. ALBERS, a citizen of the United States, residing at Albany, in the county of Albany and State of New York, have invented a certain new and useful Improvement in Automatic Fluid-Brakes, of which the following is a specification.

My invention pertains to certain new and advantageous improvements in air valves, designed primarily for service in conjunction with the air brake mechanism commonly used on railroads, the same being a substitute attachment, or special cylinder cap, applicable to any of the present known forms of air valves, and for use on passenger or freight cars, as well as locomotives, and tenders.

The fundamental feature of my invention, which I claim to be new and novel over any device now known or used in the air brake art, involves a cap, to be attached to any of the well known forms of air valves, which cap houses special mechanism and arrangement of passage-ways and ports, that will be fully described in detail hereinafter, whereby undesired quick action of the respective valves will be entirely eliminated, and the possibility and danger of an emergency application of the brakes arising inadvertently is overcome. This is accomplished without any interference with or effect upon any of the features of the valve to which it is attached, excepting the one feature of undesired quick action.

In the present well known forms of air brake valves, of whatever nature and function, the erratic and unreliable action thereof is due to various causes, the principal ones being the lodgment of any foreign matter, such as lubricant residue, grit, dirt, pipe scale, etc., around the main piston or slide valve, comprising part of the mechanism common to all forms of air valves, or if same is fitted too tight, or is effected by the cold weather or moisture. My invention overcomes this undesired quick action, regardless of the erratic action of this piston and slide valve, by permitting said piston to move to a positive service position, when a service application is made, or while the engineer is applying the brake in the service, and to move to an emergency position only when an emergency application is made and desired.

The danger of the valve going to "emergency", when it is applied to "service", is overcome and eliminated by my improved construction, thereby rendering any form of air valve carrying my device reliable and positive in its actions.

In the accompanying drawing, which illustrates one embodiment of my invention, Figure 1 is a diagrammatical view of my attachment showing the movable parts in service position; Fig. 2 is a similar view showing said movable parts in emergency position, and Fig. 3 is a modified form of one of the movable parts, as designed for a particular purpose.

It is a fact well known, to all those familiar with the air brake art, that in all mechanisms having an operative valve function there is a main piston connected to a slide valve, in which valve there are a number of ports and passage-ways. When the brake is charged the pressure on both sides of this piston is equal, and when it is desired to apply the brake air is gradually let out of the brake-pipe, thereby reducing the pressure on one side of said piston, while the pressure on the opposite, or auxiliary reservoir side of said piston, being greater, moves the piston at a speed determined by the reduction of pressure on the brake-pipe side, thereby permitting a predetermined air pressure to flow from the auxiliary reservoir into the brake cylinder. It is at this point, of the various forms of air valves, that my invention is applicable, the said main piston, above referred to, being designated by the numeral 7, while the chamber in which said piston operates is designated by the letter F, on the auxiliary reservoir side, and by the letter A on the brake-pipe side. As previously stated it is the erratic action of this piston 7 that I overcome with my attachment, and the operation is accomplished in the following manner, and by reason of the constructive features about to be described.

In Fig. 1, which shows the relative positions of the movable parts with respect to the several ports and passage-ways, when at service position, air flows from brake-pipe port "*a*" of the main valve body 8, to which said body the cap is applied, into port "*a'*" of cylinder cap 1, then into chamber "A", forcing piston 7 to move to charging position. Air also flows from port "*a*" into port "*b*" and chamber "B", holding slide valve 2 to its seat and pushing piston 4 toward the valve body until it comes in contact with the small stem 5' of the intermediate piston 5. Air flows from the chamber "B" through service port "c" formed through said piston 4, into chamber "C", holding piston 5 against leather seat 9. Chamber "E" being connected to the atmosphere through communicating ports "e" in the cylinder body 1ª, and cylinder cap 1, "f" in slide valve 2, and "g" in cylinder body 1ª, permits of an escapement of air from this chamber "E", and allows the piston 5 free movement. Air also flows from chamber "C" into chamber "D" through the port "d".

When a service application of the brakes is made piston 7, moving to service position, encounters piston 5 when it arrives in service position. Air in chambers "C" and "D" flows to the brake-pipe through service port "c", said port "c" being of sufficient capacity to permit the air pressure in chambers "C" and "D" to reduce at the same rate as the air in brake-pipe, port "a" and chamber "B", without creating enough differential to move piston 4, aided by the tension of spring 3 and friction resistance of the slide valve 2. If, when making a service application, piston 7, or the slide valve attached to it, not shown, has high friction, due to any of the various causes heretofore enumerated, instead of going to undesired emergency, as would be likely with any of the old styles or forms of cylinder caps, piston 5 will check said piston 7 and hold it in service position. It requires a differential of 10 lbs. on piston 7 to overcome the differential on piston 5.

If when applying brake in service the brake-pipe pressure is drawn down below equalization, piston 7, overcoming the resistance of piston 5, will push both pistons 5 and 4 to over reduction position. This is partially shown in Fig. 2 where the piston 7 seals on leather gasket 11. Piston 4 instead of being at the extreme left rests against the small stem of piston 5. In this position chamber "E" is cut off from the exhaust and built up to brake pipe pressure; air flowing from chamber "B". This entirely destroys the force of piston 5 by balancing the pressure in chambers "C" and "E".

Fig. 2 shows the mechanism at emergency. In this position the air in brake-pipe, not shown, port "a" and port "b", also chambers "A" and "B", is drawn down faster than the pressure in chambers "D" and "C" can escape through the service port "c". This creates sufficient differential on piston 4 to enable it to move to emergency position, when port "e" will be cut off from the atmosphere, by reason of the movement of the slide valve 2, and connected to the brake-pipe, through port "b" and chamber "B", which permits brake-pipe air to flow to chamber "E", quickly balancing piston 5. The force of piston 5 now being destroyed offers no resistance to piston 7, which immediately goes to emergency position. After the pressure in chambers "B" and "C" have equalized, spring 3 pushes the piston 4 to the right until it rests against small stem 5' of the piston 5. If the brakes are now released said spring 3 will automatically force pistons 4 and 5 to release position; as shown in Fig. 1.

Fig. 3 shows service stop or piston 12 to be used as a modified form of piston 5, when the special cylinder cap is applied to equipments having quick service features. When a service brake-pipe reduction is made the triple piston encounters stem 13, in quick service position, and compressing spring 14, triple piston moves to full service position. Except for this one change in the construction for quick service my special cylinder cap is the same for all equipments. In order to move piston 7 in the different mechanisms, such as triple, distributing or control valves of the present known forms, it is necessary to obtain a differential before said piston can be moved, while in my cap I employ the intermediary piston 5, against which the main piston 7 must come in contact when a service application is to be made, but on account of there being an air pressure in the chamber "C" said piston 7 cannot move beyond service position, but when an emergency application is being made, and the air pressure in chamber "A", which is the brake-pipe side of said piston 7, is reduced rapidly, and at the same time the pressure is likewise rapidly reduced in chamber "B", the air therefrom passing to chamber "E", which is the right side of the piston 5, thus it will be seen that in an emergency application the differential pressure on piston 5 is destroyed, thus permitting piston 7 to move piston 5. In other words, by means of my attachment it is possible to obtain quick action of the valve by destroying the differential of pressures on the opposite sides of the piston 5, and building up the pressure on the weaker side; thereby balancing same.

My attachment cap will permit of less expensive lubricants being used in conjunction with the air brake mechanism, owing to the fact that the successful working and efficiency of my device does not depend upon any kind of lubricant, rather the high friction, foreign matter, etc., which causes such disastrous results on present day equipments, when found in my special cap, will act as an aid in overcoming the bad effects of the same condition in the mechanism to which it is applied.

The application and use of a solid block or piston, as constructively shown in the member 5, in place of the spring and stem equipment used in the present forms of air valves, increases the emergency efficiency and sensitiveness. The resisting power of the solid block or piston is removed, or reduced to a minimum, when making an emergency application of the brakes, by balancing the air pressure on both sides thereof, as heretofore described, while with the old style cap it is necessary to overcome the tension of said spring before the main piston will move to emergency.

When used on certain special equipments having an over-reduction position, or venting feature after a predetermined reduction, i. e., a position between " service " and " emergency ", the mechanism contained in my cap offers no resistance, other than the weight of said intermediate piston and spring actuated piston, to the movement of the main piston when it is advancing from service position toward emergency position. This is brought about by an equalization of pressures against opposite sides of the intermediate piston 5, after equalization has taken place between the auxiliary reservoir and brake cylinders, which removes the impediment or barrier imposed in the path of said main piston, and permits said main piston shoving the said intermediate piston and spring actuated piston ahead of it, as it moves into emergency position. My cap also prevents the piston of all equipments, to which it may be attached, from inadvertently jumping past first service into secondary service, or into emergency position. I also claim that with the use of my improved cylinder cap the time interval for cleaning and inspecting of air brake equipments will be increased; thereby effecting a saving in the cost of labor.

What I claim as my invention is:

1. In an automatic fluid brake a valve attachment or cap positioned adjacent to the main piston, a spring actuated and apertured piston in said cap operatable in a suitable chamber; a slide valve controlled by the movement of said spring actuated piston; a third piston in said cap operatable in a suitable chamber intermediate of said main piston and spring actuated piston; and suitable passage-ways and ports connecting said chambers with the train brake-pipe and atmosphere.

2. In an automatic fluid brake a valve attachment or cap positioned adjacent to the main piston; a spring actuated and apertured piston in said cap; a third piston intermediate of said main piston and spring actuated piston; and suitable passage-ways and ports connecting the chambers in which said pistons operate with the train brake-pipe and atmosphere, whereby said main piston will be prevented, by a differential of pressures created against opposite sides of said intermediate piston, from going to an emergency position when a service application of the brakes is made.

3. In an automatic fluid brake a valve attachment or cap positioned adjacent to the main piston, involving a spring actuated and apertured piston; a slide valve controlled by said latter member; a third piston intermediate of the said main piston and spring actuated piston, all three of said pistons being operatable in suitable chambers; and suitable ports and passage-ways connecting the several chambers, brake-pipe and atmosphere, whereby undesired quick action of the main piston is overcome by setting up a differential of pressures on opposite sides of said intermediate piston during a service application of the brakes.

4. In an automatic fluid brake a valve attachment or cap positioned adjacent to the main piston, involving a spring actuated and apertured piston; a slide valve controlled by said latter piston; a third piston intermediate of the said main piston and spring actuated piston, all three of said pistons being operatable in suitable chambers; and suitable ports, and passage-ways connecting the several chambers, brake-pipe and atmosphere whereby quick action of the main piston is permitted by destroying the differential of pressures on opposite sides of said intermediate piston during an emergency application of the brakes.

5. In an air brake mechanism a special cylinder cap or attachment positioned adjacent to the main piston of any distributing, triple, or control valve, involving a spring actuated piston operatable in a suitable chamber; a slide valve governed by the movement of said second piston in which is a port; ports over which said valve works; a port in said second piston; a third piston intermediate of the first and second pistons carrying a projection adapted to be engaged by the said second piston, and a longer projection to be engaged by the main piston; a chamber on each side of said third piston, the chamber on one side being connected by a port with an auxiliary chamber, and the chamber on the opposite side by passage-ways with the atmosphere through the said slide valve; and a train brake-pipe connection leading to one side of the main piston and also to one side of the said second piston.

6. In an air brake mechanism a special cylinder cap or attachment positioned adjacent to the main piston of any distributing, triple, or control valve, involving a spring actuated piston operatable in a suitable chamber; a slide valve governed by the movement of said piston, in which is a port; ports over which said valve works; a port in said second piston; a third piston intermediate of the first and second pistons carrying a projection adapted to be engaged by the said second piston and a longer projection to be engaged by the main piston; a chamber on each side of said third piston; and a train brake-pipe connection in communication with both sides of said third piston whereby the pressure will be equalized when the main piston is moving to emergency position.

7. In an automatic fluid brake a valve attachment or cap positioned adjacent to the main piston involving suitably arranged chambers, ports, and passage-ways; a spring actuated and apertured piston; a solid piston intermediate of the main piston and spring actuated piston; a train brake-pipe connection; and automatic means for moving the intermediate piston in one direction to check the main piston at service position, and for moving it in an opposite direction to permit said main piston going to emergency position.

8. In an automatic fluid brake a valve attachment or cap positioned adjacent to the main piston; a resiliently actuated and apertured piston in said cap; a third piston between the main piston and resiliently actuated piston; and means for providing a differential of pressures on opposite sides of said third piston to check the main piston from moving to over-reduction or emergency positions when a service application of the brakes is made.

9. An attachment cap for air valves positioned adjacent to the main piston, suitable chambers in said cap, a spring actuated and apertured piston operatable in one of said chambers, and a third piston in said cap adapted to be engaged at one side by the main piston and at the opposite side by said spring actuated piston.

10. An attachment cap for air valves positioned adjacent to the main piston, suitable chambers in said cap, a spring actuated and apertured piston operatable in one of said chambers, and a third piston in said cap having an extension portion at one side to be engaged by said main piston and an extension at the opposite side to be engaged by the said spring actuated piston.

11. In an automatic fluid brake a valve attachment or cap positioned adjacent to the main piston, a resiliently actuated piston in said cap, and a resistance piston in said cap, intermediate of the main piston and resiliently actuated piston, to check said main piston from moving to emergency position upon a service application of the brakes.

12. In an automatic fluid brake a valve attachment or cap positioned adjacent to the main piston, a resiliently actuated piston in said cap, and an intermediate piston in said cap held in one position by a differential of pressures to check the main piston at service position, and movable upon an equalization of pressures to permit said main piston going to emergency position.

13. In an automatic fluid brake a valve attachment or cap positioned adjacent to the main piston; a resiliently actuated piston in said cap; and a resistance piston in said cap, intermediate of the main piston and resiliently actuated piston, which operates to check the main piston from moving beyond service position, when a service application of the brakes is made, but permits said main piston moving beyond service position when an over-reduction or emergency application of the brakes is made.

14. An attachment cap for air valves positioned adjacent to the main piston, suitable chambers in said cap, a resiliently actuated piston in said cap, and a retardant piston in said cap, positioned for reciprocal engagement between the main piston and resiliently actuated piston.

In testimony whereof, I affix my signature in the presence of two witnesses.

LOUIS H. ALBERS.

Witnesses:
 HAZEL WIBERLY,
 H. W. STEVENSON.

---

Copies of this patent may be obtained for five cents each, by addressing the "Commissioner of Patents, Washington, D. C."